United States Patent [19]
Blair et al.

[11] Patent Number: 5,560,404
[45] Date of Patent: Oct. 1, 1996

[54] OIL DRAIN AND DISPOSAL DEVICE

[76] Inventors: Rodney L. Blair, 1009 Dapple Way, Bakersfield, Calif. 93312; Philip G. Chauvet, 6644 Rippling Brook Dr. SE., Salem, Oreg. 97301

[21] Appl. No.: 399,523

[22] Filed: Mar. 7, 1995

Related U.S. Application Data

[63] Continuation-in-part of Ser. No. 217,666, Mar. 25, 1994, abandoned.

[51] Int. Cl.$^6$ ................. B65B 1/04; B65B 3/04
[52] U.S. Cl. ............. 141/98; 141/237; 141/243; 141/345; 141/364; 184/106
[58] Field of Search .............. 141/98, 106, 234, 141/237, 238, 240, 242, 244, 246, 302, 237, 243, 331, 335, 336, 344, 345, 351, 353, 357, 364, 247, 372, 378, 383, 384, 290, 299; 184/1.5, 106

[56] References Cited

U.S. PATENT DOCUMENTS

| 340,646 | 4/1886 | Westgate | 141/335 |
|---|---|---|---|
| 557,876 | 4/1896 | Poston | 141/335 |
| 1,363,480 | 12/1920 | Murphy | 141/372 |
| 2,872,953 | 2/1959 | Duncan | 141/237 |
| 4,880,156 | 11/1989 | Wallet | 141/340 |
| 5,381,839 | 1/1995 | Dowd | 141/237 |

*Primary Examiner*—Henry J. Recla
*Assistant Examiner*—Steven O. Douglas
*Attorney, Agent, or Firm*—Robert M. Sperry

[57] ABSTRACT

An improved oil drainage and disposal device comprising a generally box-like container having a large opening formed eccentrically in one surface of the container to permit a plurality of oil containers to be inserted into the interior of the container for storage and to allow oil being drained from a vehicle to enter the container through the opening, a plurality of annular openings formed in a second surface of the container perpendicular to the one surface for releasably retaining the necks of oil containers, closures mounted in each of the annular openings and resiliently urged into a position to seal the openings, and funnels formed in the second surface about each of the openings.

12 Claims, 4 Drawing Sheets

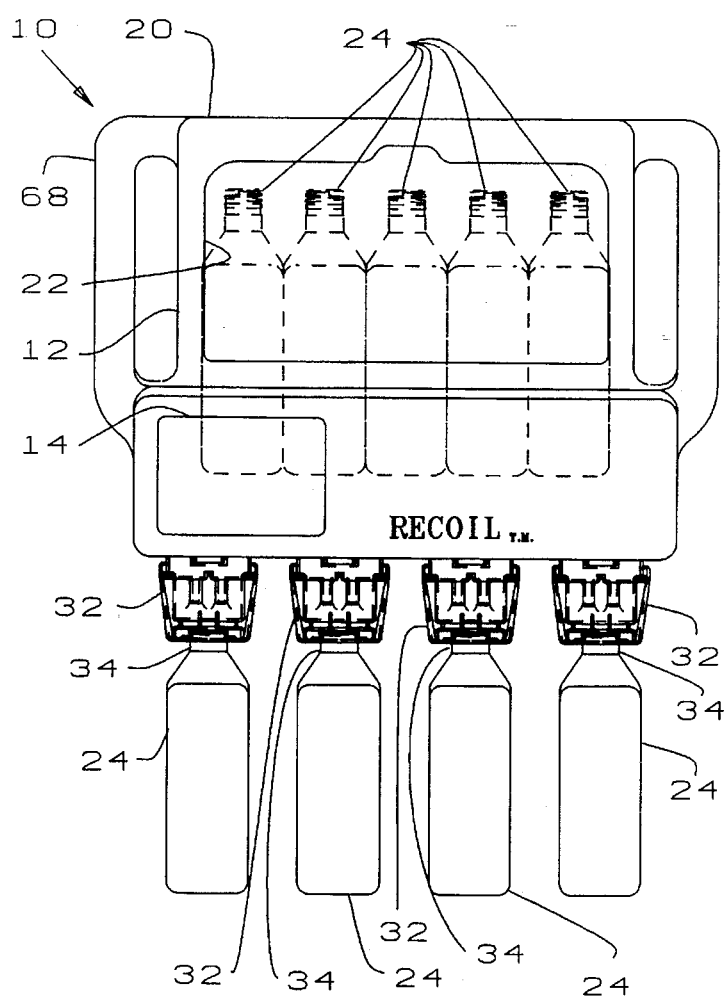
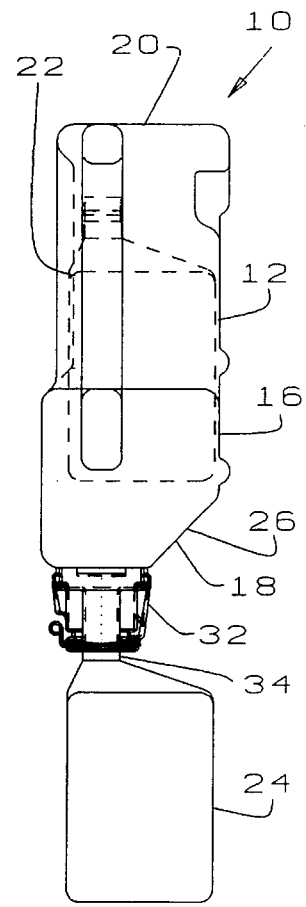
FIG. 1  FIG. 3
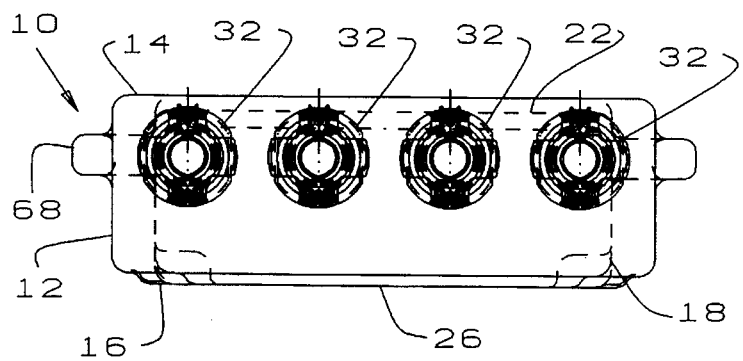
FIG. 2

OIL DRAIN AND DISPOSAL DEVICE

RELATED CASES

This application is a Continuation-In-Part of our prior patent application Ser. No. 08/217,666, filed Mar. 25, 1994, and now abandoned.

FIELD OF INVENTION

This invention relates to oil drainage and disposal devices and devices particularly to apparatus for draining used oil from automotive vehicles and the like and for disposing of the used oil in an environmentally safe manner.

PRIOR ART

As is well known, automotive vehicles use oil for lubricating and cooling their engines and, periodically, this oil must be drained out and replaced. Conventionally, the oil is drained into a suitable pan and the used oil must be disposed of. For many years, such used oil was simply dumped on the ground or down a sewer. However, in recent years, it has been learned that petroleum products, such as lubricating oil, are highly carcinogenic and is a serious source of environmental contamination. Consequently, the dumping of used oil, as was done in the past, is now widely condemned and many communities have passed laws making such dumping a criminal offense. Thus, having drained the oil from a vehicle into a drain pan, a person is now required to pour the used oil from the drain pan into suitable containers and to transport the used oil to an approved disposal area. Unfortunately, it is often difficult to find suitable containers and the act of pouring the oil from the drain pan into such containers is a delicate task, which often results in spillage of at least some of the oil, with resultant contamination of the surrounding area.

At the same time, it was formerly standard practice to sell lubricating oil in cans having metal lids which could be perforated by a conventional punch-type opener to allow the oil to be poured through a funnel into the oil fill spout of a vehicle. This was also a difficult and delicate chore which often resulted in spillage. However, in recent years, it has become customary to sell lubricating oil in plastic containers having lids which can simply be unscrewed to allow the neck of the plastic container to be inserted into the oil fill spout of the vehicle. This is generally easier and cleaner than the funnel method. However, the plastic containers always contain residual traces of the oil which presents disposal problems, as noted above. Moreover, the plastic containers present an additional disposal problem since the plastics do not decompose and, hence, remain intact indefinitely in landfills and the like.

Numerous prior art devices have been proposed to overcome these problems. However, many of the prior art devices have provided only partial solutions. Thus, prior art devices have been proposed to facilitate draining oil into suitable containers for delivering the used oil to an appropriate disposal facility, but have done nothing about solving the problem of disposal of the plastic oil containers. Other prior art devices have been complicated to use and expensive to purchase. Yet other prior art devices have proposed dual-chambered containers, having one empty chamber into which the used oil from the vehicle may be drained and having a second chamber filled with clean oil for refilling the vehicle. However, these devices are of value only if the oil companies sell the oil in such containers. Otherwise, the oil must still be transferred into these containers from the original containers, which increases the likelihood of spillage and does not resolve the problem of disposing of the original oil containers. A search in the United States Patent Office has revealed the following:

| PATENT NO. | INVENTOR | ISSUED |
| --- | --- | --- |
| 4,524,866 | P. J. Pollacco | Jun. 25, 1985 |
| 4,533,042 | W. E. Pollacco | Aug. 6, 1985 |
| 4,296,838 | M. L. Cohen | Oct. 27, 1981 |
| 4,640,431 | R. W. Harrison | Feb. 3, 1987 |

Each of these references is subject to the disadvantages discussed above. Thus, none of the prior art oil draining and disposal devices have been entirely satisfactory.

BRIEF SUMMARY AND OBJECTS OF INVENTION

These disadvantages of the prior art are overcome with the present invention and an improved oil drainage and disposal device is proposed which is inexpensive to purchase and is simple to use, yet which eliminates the problems involved in draining the oil from a drain pan into suitable containers for delivery to a disposal facility and which permits repeated reuse of the original oil containers.

These advantages of the present invention are preferably attained by providing an improved oil drainage and disposal device comprising a generally box-like container having a large opening formed eccentrically in one surface of said container to permit a plurality of oil containers to be inserted into the interior of said container for storage and to allow oil being drained from a vehicle to enter said container through said opening, at least one cam-actuated opening formed in a second surface of said container perpendicular to said one surface for releasably retaining the necks of oil containers, and closure means mounted in each of said cam-actuated openings and resiliently urged into a position to seal said openings.

Accordingly it is an object of the present invention to provide an improved oil drainage device.

Another object of the present invention is to provide an improved oil disposal device.

An additional object of the present invention is to provide an improved oil drainage and disposal device.

A further object of the present invention is to provide an improved oil drainage and disposal device which is economical to purchase and easy to use.

Another object of the present invention is to provide an improved oil drainage and disposal device which eliminates the problems involved in draining the oil from a drain pan into suitable containers for delivery to a disposal facility.

An additional object of the present invention is to provide an improved oil drainage and disposal device which permits repeated reuse of the original oil containers.

A specific object of the present invention is to provide an improved oil drainage and disposal device comprising a generally box-like container having a large opening formed eccentrically in one surface of said container to permit a plurality of oil containers to be inserted into the interior of said container for storage and to allow oil being drained from a vehicle to enter said container through said opening, at least one cam-actuated openings formed in a second surface of said container perpendicular to said one surface for releasably retaining the necks of oil containers and closure means mounted in each of said cam-actuated openings and resiliently urged into a position to seal said openings.

These and other objects and features of the present invention will be apparent from the following detailed description, taken with reference to the figures of the accompanying drawing.

BRIEF DESCRIPTION OF THE DRAWING

FIG. 1 is a side view of an oil drainage and disposal device embodying the present invention;

FIG. 2 is a bottom view of the oil drainage and disposal device of FIG. 1;

FIG. 3 is an end view of the oil drainage and disposal device of FIG. 1;

DETAILED DESCRIPTION OF THE INVENTION

Figure 4:
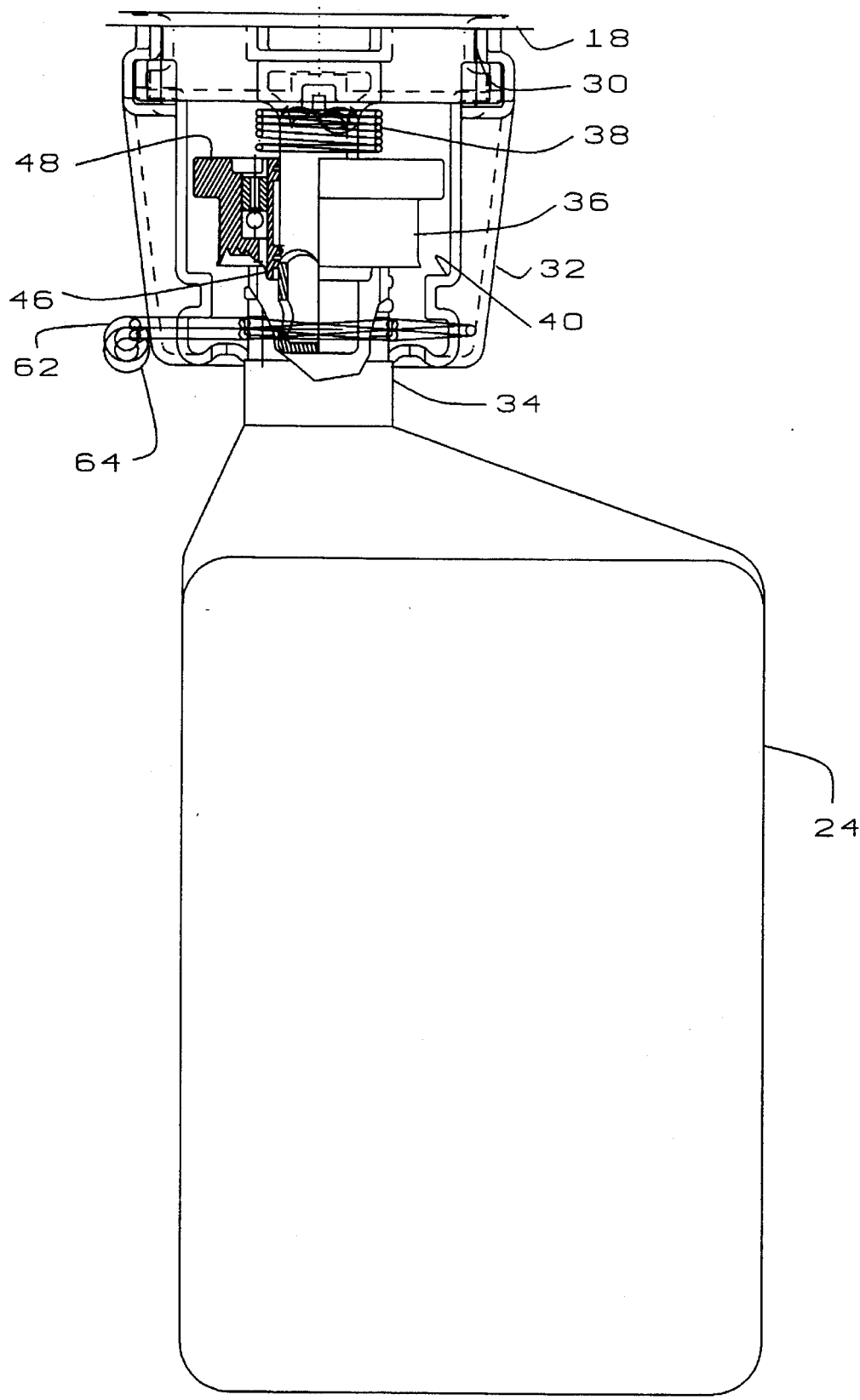
FIG. 4 is an enlarged end view of the oil drainage and disposal device of FIG. 1, with the closure means shown in section.
Figure 5:
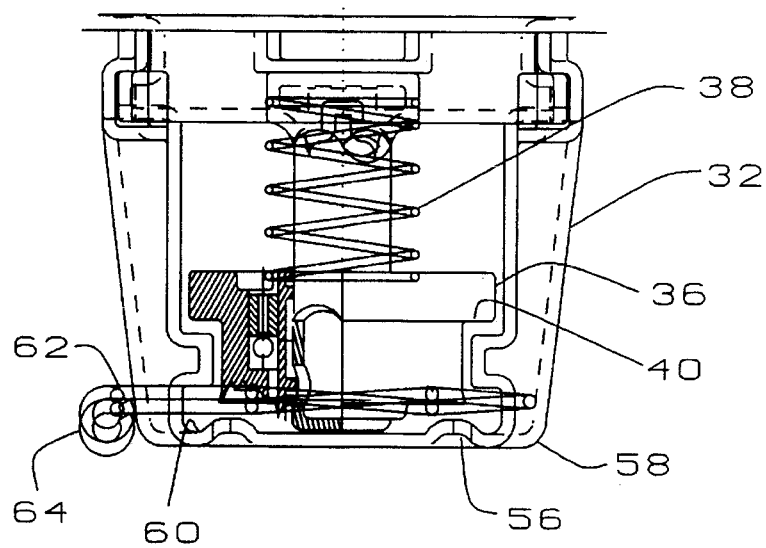
FIG. 5 is an enlarged side view of the closure means of the oil drainage and disposal device of FIG. 1.
Figure 6:
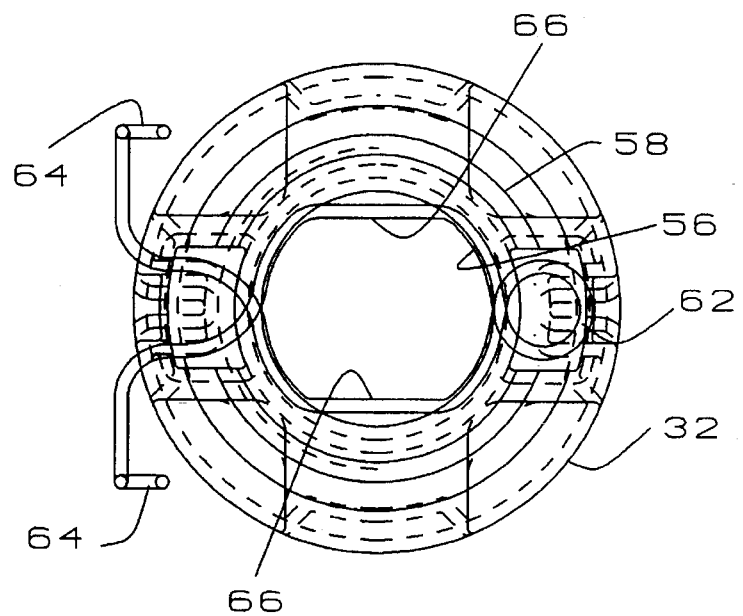
FIG. 6 is a bottom view of the closure means of the oil drainage and disposal device of FIG. 1.
Figure 7:
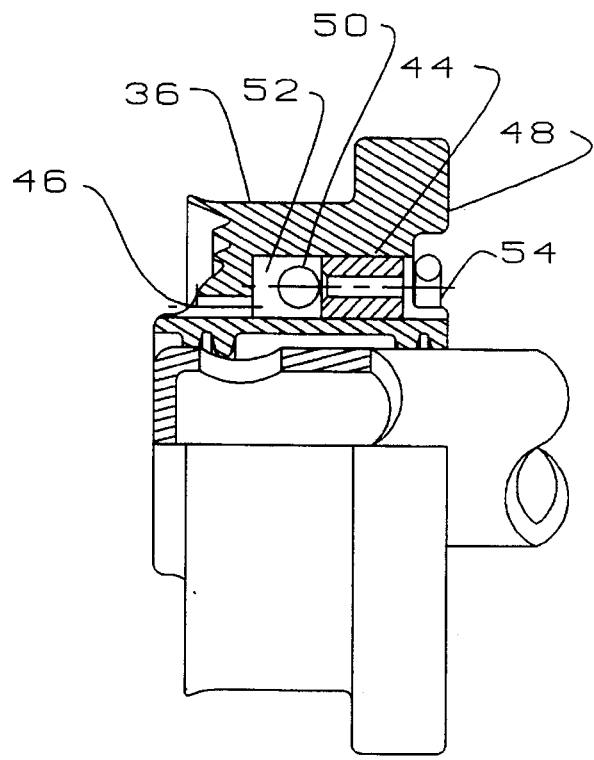
FIG. 7 is a vertical section through the wiper of the closure means of FIG. 1.
Figure 8:
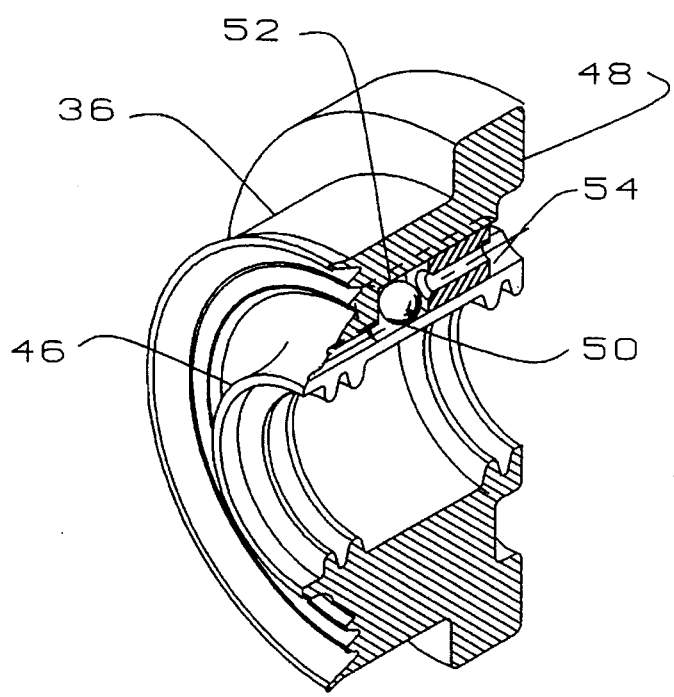
FIG. 8 is an isometric sectional view of the wiper of FIG. 7.

In that form of the present invention chosen for purposes of illustration in the drawings, FIGS. 1, 2 and 3 show an oil drainage and disposal device, indicated generally at 10, comprising a generally box-like container 12 having a front wall 14, a solid rear wall 16, a bottom 18 and a top 20. The front wall 14 is formed with a large opening 22 located eccentrically of the front wall 14, which is preferably dimensioned to allow a plurality of oil containers 24 to be inserted through the opening 22 into the interior of the container 12 for storage. The bottom 18 has an inclined portion 26 communicating with the rear wall 16 and at least one funnel area 30 about which is mounted an internally cam-actuated closure member 32, which serves to releasably retain the externally threaded neck 34 of a respective one of the oil containers 24, as best seen in FIGS. 4–6. Each of the internally cam-actuated closure members 32 is dimensioned to mate with the external threads on the necks 34 of the oil containers 24 and a wiper means 36 is resiliently mounted in each of the openings 32 and is normally urged, by suitable means such as springs 38, into sealing relation with an annular flange 40 encircling the tubular neck 42 of the closure member 32, as best seen in FIGS. 4, 5 and 6. The closure means 36 is a hollow member encircling the tubular neck portion 42 which projects downwardly from the bottom 18 of the container 12. As best seen in FIGS. 7 and 8, the wiper 36 is formed with a channel 44 extending vertically through the wiper 36 and the wiper 36 has a flanged lower end 46 formed to sealingly mate with the necks 34 of the containers 24. The upper portion 48 of the wiper means 36 is formed to sealingly mate with the exterior surface of the tubular neck portion 42 to prevent leakage from the tubular neck portion 42 when no oil container 24 is engaged with the closure means 32 and spring 38 urges the wiper means 36 to its full downward position. A ball member 50 is slideably mounted within the channel 44 of the wiper 32 and is retained in a chamber 52 formed by a tubular member 54.

The ball 50 is formed of material, such as air-entrained ceramic, having a specific gravity less than that of oil, which allows the ball 50 to float upward, when oil enters the chamber 52, to sealingly engage the tubular member 54 to prevent oil from flowing through the tubular member 54. As best seen in FIGS. 4, 5 and 6, the closure member 32 is a generally cylindrical member having an opening 56 formed in the lower end 58 of the closure member 32 below the annular flange 40 and a recess 60 is formed below the annular flange 40 to receive a spring 62. The spring 62 is generally U-shaped, having its end portions 64 crossed and formed to provide handles 64, while the main side portions 66 of the spring 62 are spaced apart and are relatively flat, extending generally parallel to each other, as best seen in FIG. 6, which serve to clamp about the neck portions 34 of the oil containers 24 to releasably retain the neck portions 34 of the oil containers 24 is engagement with the closure member 32. When the neck portion 34 of an oil container 24 is inserted between the side portions 66 of the spring, 62, the neck portion 34 forces the sides 66 of the spring 62 apart and the side portions 66 of the spring 62 bear against the threads of the neck 34 to releasably retain the neck portion 34 and, thereby, to retain the oil container 24 in engagement with the closure member 32. Also, because the sides portions 66 of the spring 62 are relatively flat and parallel, the side portions 66 can accommodate neck portion 34 of substantially any dimension. Finally, a handle 68 may be provided on the oil drainage and disposal device 10 to facilitate carrying and handling of the device 10.

In use, a plurality of oil containers 24 may be inserted through opening 22 for storage within the container 12 of the oil drainage and disposal device 10. When needed, the oil containers 24 may be removed and the container 12 may be placed beneath a vehicle, lying on its rear surface 16 with the bottom 18 lying vertically and the front surface 14 facing upward and with opening 22 positioned to receive the oil as it is drained from the vehicle to allow the used oil to be retained within the container 12. When all of the used oil has been drained from the vehicle, the oil containers 24 may be emptied into the oil fill spout of the vehicle. As each of the oil containers 24 is emptied, the xteriorly threaded] neck 34 of the oil container 24 may be inserted into an appropriate one of the interiorly cam-actuated closure members 32. As this occurs, the neck 34 of the oil container 24 will engage the lower flanged end 46 of the wiper means 36 and will force the wiper means 36 inwardly of the closure means 32 against the urging of spring 38. Because the neck 34 of the oil container 24 mates with the flanged end 46 of the wiper 36, no oil will spill out of the closure member 32 as the oil containers 24 are captured and releasably retained by the spring 62. When all of the empty oil containers 24 have been captured, the user grasps the oil drainage device 10 by the handle 68 and lifts it to the position seen in FIGS. 1–3, with the front wall 14 and rear wall 16 extending vertically and with the container 12 being supported by the plurality of empty oil containers 24. When this is done, the surface of the oil within the container 12 will lie parallel to the lower surface 18 of the container 12 below the lower edge of the opening 22. As noted above, the closure means 32 are hollow tubular members and are provided with tubular neck portions 42. Consequently, the oil within the container 12 can flow through the neck portions 42 and the wiper means 36 into the open necks 34 of the oil containers 24. As each of the oil containers 24 becomes full, the oil will fill chamber 52 within the wiper member 36 and will cause the ball 50 to float upward to block the tubular member 54 and, hence to prevent further flow of oil through the neck portion 42 and wiper member 36 into the container 24. The remaining oil will flow through the interior of the container 12 to the other neck portions 42 and into the oil containers 24 attached thereto. When all of the oil containers are filled with the drained oil, they may be removed from the respective closure members 32 by squeezing the handles 64 of the spring 62 together to cause the side portions 66 of the spring 62 to spread apart and, hence, to release the neck 34 of the container 24. As this is done, the neck 34 of the oil container 24 will move outwardly through the closure member 32, which allows springs 38 to drive the wiper means 36 downwardly toward the annular flange 40 encircling each of the closure members 32. Before the neck 34 of the oil container 24 is fully removed, the upper portion 48 of the corresponding one of the wiper means 36 will sealingly engage the neck portion 42 of the container 12 to prevent discharge of oil from the associated one of the closure members 32. Once the refilled oil containers 24 have been removed from the closure members 32, they may be used to transport the used oil to an appropriate disposal facility or, preferably, may be delivered to a suitable refinery where the oil can be reprocessed and the oil containers 24 may be refilled with clean, reconditioned oil. In this way, the oil presents no disposal or contamination problem and the oil containers 24 may be reused indefinitely and, hence, they also present no disposal problem.

Obviously, numerous variations and modifications can be made without departing from the spirit of the present invention. Therefore, it should be clearly understood that the form of the present invention described above and shown in the figures of the accompanying drawing is illustrative only and is not intended to limit the scope of the present invention.

What is claimed is:

1. An oil drainage device comprising:

a generally box-like container having a large opening formed eccentrically in one surface of said container, a plurality of annular openings formed in a second surface of said container perpendicular to said one surface for releasably retaining the necks of oil containers, closure means mounted in each of said annular openings including a self-acting venting means allowing only air and no oil to escape from said oil container while being filled with oil, and resilient means urging said closure means into a position to seal said openings.

2. The device of claim 1 wherein:

said eccentric opening is dimensioned to permit a plurality of oil containers to be inserted into the interior of said container for storage.

3. The device of claim 1 wherein:

said eccentric opening is dimensioned to allow oil being drained from a vehicle to enter said container through said opening.

4. The device of claim 1 further comprising:

funnel means formed in said second surface about said second opening.

5. The device of claim 1 wherein:

each of said closure means comprises a hollow tubular member having an opening communicating the interior of said tubular member with the interior of said container and formed with a flanged lower end and an upper portion formed to sealingly engage the interior of said second surface of said container.

6. The device of claim 5 further comprising:

an annular flange encircling said second opening for sealing engagement by the flanged lower end of said closure means.

7. The device of claim 1 wherein:

each of said annular openings is dimensioned to receive the threaded neck of an oil container and said resilient means is mateable with the threads on the neck of said oil container.

8. The device of claim 1 wherein:

said resilient means is displaceable by the neck of an oil container being inserted into said second opening to allow oil contained within said container to flow into said oil container.

9. The device of claim 1 wherein:

said resilient means includes a pair of parallel portions normally urged to positions spaced apart a distance less than the diameter of said neck of said oil container.

10. The device of claim 9 further comprising:

means for moving said parallel portions apart to facilitate insertion and removal of said neck of said oil container.

11. The device of claim 1 where-in:

said self-acting venting means comprises (a) a chamber having one opening communicating with the atmosphere and having a second opening communicating with the interior of said neck of an oil container when attached to at least one of said annular openings and, (b) a ball slideably moving inside said chamber, said ball formed of material having a specific gravity less than that of oil and so acting to permit any air to escape from said neck through said one opening to the atmosphere, and also acting in the absence of air to prevent outflow of oil from said neck by moving into a position to seal off said second opening.

12. An oil drainage device comprising:

a generally box-like container having a large opening formed eccentrically in one surface of said container, a plurality of annular openings formed in a second surface of said container perpendicular to said one surface for releasably retaining the necks of oil containers, closure means mounted in each of said annular openings including a self-acting venting means allowing only air and no oil to escape from said oil container while being filled with oil, resilient means including a pair of parallel portions normally urged to positions spaced apart a distance less than the diameter of said neck of said oil container, and means for moving said parallel portions apart to facilitate insertion and removal of said neck of said oil container.

* * * * *